(12) United States Patent
Choi et al.

(10) Patent No.: US 7,817,343 B2
(45) Date of Patent: Oct. 19, 2010

(54) ELECTROWETTING LENS

(75) Inventors: Jae-young Choi, Yongin-si (KR);
Jee-hwan Jang, Yongin-si (KR); Sun-il Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 350 days.

(21) Appl. No.: 11/774,693

(22) Filed: Jul. 9, 2007

(65) Prior Publication Data
US 2008/0100922 A1   May 1, 2008

(30) Foreign Application Priority Data
Oct. 26, 2006   (KR)   .............. 10-2006-0104693

(51) Int. Cl.
    *G02B 1/06*   (2006.01)
(52) U.S. Cl. .................................................. 359/665
(58) Field of Classification Search .......... 359/665–668
    See application file for complete search history.

(56) References Cited

U.S. PATENT DOCUMENTS

2005/0270672 A1 * 12/2005 Feenstra et al. ............. 359/845
2006/0221458 A1 * 10/2006 Kato et al. .................. 359/666

* cited by examiner

*Primary Examiner*—Joseph Martinez
*Assistant Examiner*—James R Greece
(74) *Attorney, Agent, or Firm*—Cantor Colburn LLP

(57) ABSTRACT

An electrowetting lens which can move its optical axis using a multiple electrode structure includes: a substrate; a dielectric barrier wall formed on the substrate; polar and non-polar solutions fluidly contained inside the dielectric barrier wall; first and second lower electrodes inserted through lower portions of the dielectric barrier wall in contact with the polar solution, the first and second lower electrodes facing each other; and first and second multiple electrodes respectively disposed in mutually facing first and second legs defining the dielectric barrier wall, each of the first and second multiple electrodes being divided into a plurality of vertically arranged electrode cells.

14 Claims, 14 Drawing Sheets

ELECTROWETTING LENS

This application claims priority to Korean Patent Application No. 10-2006-0104693, filed on Oct. 26, 2006, and all the benefits accruing therefrom under 35 U.S.C. §199, the contents of which in its entirety is herein incorporated by reference.

BACKGROUND OF THE INVENTION

1. Field of the Invention

The present invention relates to an electrowetting lens, and more particularly, to an electrowetting lens which can change an optical axis thereof using a multiple electrode structure.

2. Description of the Related Art

Various liquid lenses using electrowetting effect are well known. FIGS. 1A and 1B are schematic cross-sectional views illustrating a conventional electrowetting lens 10. Referring to FIG. 1A, the conventional electrowetting lens 10 includes a substrate 11, a dielectric barrier wall 12 vertically formed on the substrate 11, and polar and non-polar solutions 13 and 14, respectively, filled in the dielectric barrier wall 12. For example, the polar solution 13 may be water, and the non-polar solution 14 may be oil. In this case, since the water is heavier than the oil, the polar solution 13 is placed under the non-polar solution 14, as shown in FIG. 1A. First electrodes 15 are horizontally disposed on the substrate 11. In more detail, the first electrodes 15 are inserted through lower portions of the dielectric barrier wall 12 and make contact with the polar solution 13. Second electrodes 16 are vertically disposed in legs of the dielectric barrier wall 12.

Although not shown in FIG. 1A, inner surfaces 12a of the dielectric barrier wall 12 are coated with a hydrophobic material. Therefore, the polar solution 13 tends to reduce contact area with the inner surfaces 12a of the dielectric barrier wall 12, and the non-polar solution 14 tends to increase contact area with the inner surfaces 12a. As a result, as shown in FIG. 1A, the polar solution 13 has a convex top surface. In this case, the electrowetting lens 10 functions as a convex lens when the polar solution 13 has a refractive index larger than a refractive index of the non-polar solution 14.

When a voltage is applied to the first and second electrodes 15 and 16 using a power supply 17, the dielectric barrier wall 12 is electrically charged as shown in FIG. 1B. Then, the inner surfaces 12a of the dielectric barrier wall 12 changes from hydrophobic to hydrophilic. Therefore, unlike in FIG. 1A, the polar solution 13 tends to increase contact area with the inner surfaces 12a, and the non-polar solution 14 tends to decrease contact area with the inner surfaces 12a. As a result, as shown in FIG. 1B, the top surface of the polar solution 13 is concaved.

FIGS. 2A and 2B are schematic cross-sectional views illustrating another conventional electrowetting lens 20 providing zooming and focusing functions. Referring to FIG. 2A, the conventional electrowetting lens 20 includes a polar solution 21 filled in a tub, a non-polar solution 22 located in the middle of the polar solution 21, first electrodes 23 contacting the polar solution 21, second electrodes 24, third electrodes 25, fourth electrodes 26, fifth electrodes 26', sixth electrodes 25', and seventh electrodes 24'. The second through seventh electrodes 24, 25, 26, 26', 25', and 24' are disposed around the tub. Initially, symmetric voltages are applied to the second to seventh electrodes 24, 25, 26, 26', 25', and 24' so as to keep the non-polar solution 22 in a convex state. That is, the same voltages are respectively applied to the second and seventh electrodes 24 and 24', the third and sixth electrodes 25 and 25', and the fourth and fifth electrodes 26 and 26'.

Referring to FIG. 2B, a right portion of the polar solution 21 is moved to the left using a pump 28 and a conduit 27. Then, the convex non-polar solution 22 is moved to the right as indicated by the arrow indicating a moving direction of the non-polar solution 22 in FIG. 2A. Here, voltages to electrodes located in the moving direction of the non-polar solution 22 are increased, and voltages to electrodes located in the opposite direction to the moving direction of the non-polar solution 22 are decreased. In this manner, the non-polar solution 22 can be moved back and forth for zooming and focusing. However, the optical axis of the conventional electrowetting lenses cannot be adjusted for controlling an optical path.

BRIEF SUMMARY OF THE INVENTION

The present invention provides an electrowetting lens which can change its optical axis and surface curvature.

According to an exemplary embodiment of the present invention, there is provided an electrowetting lens including: a substrate; a dielectric barrier wall formed on the substrate; polar and non-polar solutions fluidly contained inside the dielectric barrier wall; first and second lower electrodes inserted through lower portions of the dielectric barrier wall in contact with the polar solution, the first and second lower electrodes facing each other; and first and second multiple electrodes respectively disposed in mutually facing first and second legs defining the dielectric barrier wall, each of the first and second multiple electrodes being divided into a plurality of vertically arranged electrode cells.

The dielectric barrier wall may have a circular or polygonal box shape.

The substrate may be transparent.

Both the first lower electrode and the first multiple electrode may be disposed at the first leg of the dielectric barrier wall, and both the second lower electrode and the second multiple electrode may be disposed at the second leg of the dielectric barrier wall.

When the dielectric barrier wall has a circular box shape, at least one pair of a first lower electrode and a first multiple electrode and at least one pair of a second lower electrode and a second multiple electrode may be arranged along a circumference of the dielectric barrier wall, and the pairs may face each other.

When the dielectric barrier wall has a polygonal shape, at least one pair of a first lower electrode and a first multiple electrode and at least one pair of a second lower electrode and a second multiple electrode may be respectively disposed at the mutually facing first and second legs of the dielectric barrier wall.

The electrode cells of the first and second multiple electrodes may each individually receive a voltage.

An interface between the polar and non-polar solutions may be sloped by making a height of charged electrode cells of the first multiple electrode different from a height of charged electrode cells of the second multiple electrode.

A voltage may be applied to only some of the electrode cells located at an interface between the polar and non-polar solutions.

A voltage applied to some of the electrode cells located at an interface between the polar and non-polar solutions may be different from a voltage applied to the other electrode cells.

A voltage may be applied to only some of the electrode cells facing the polar solution.

A voltage applied to some of the electrode cells facing the polar solution may be different from a voltage applied to the other electrode cells.

The polar solution may be an aqueous solution, and the non-polar solution may be an oil solution.

The aqueous solution and the oil solution may have different refractive indexes.

According to another exemplary embodiment of the present invention, there provided a microlens array including a plurality of two-dimensionally arranged electrowetting lenses, each of the electrowetting lenses including the same elements as the electrowetting lens described above.

According to another aspect of the present invention, there is provided a lenticular lens sheet including a plurality of electrowetting lenses arranged side by side, each of the electrowetting lenses including the same elements as the electrowetting lens described above.

According to another aspect of the present invention, there is provided a three-dimensional image display device including: a display panel; and a lenticular lens sheet disposed in front of the display panel, the lenticular lens sheet being formed by arranging a plurality of electrowetting lenses each including the same elements as the electrowetting lens described above.

BRIEF DESCRIPTION OF THE DRAWINGS

The above and other aspects, features and advantages of the present invention will become more apparent by describing in further detail exemplary embodiments thereof with reference to the attached drawings, in which.

DETAILED DESCRIPTION OF THE INVENTION

Figure 1A:
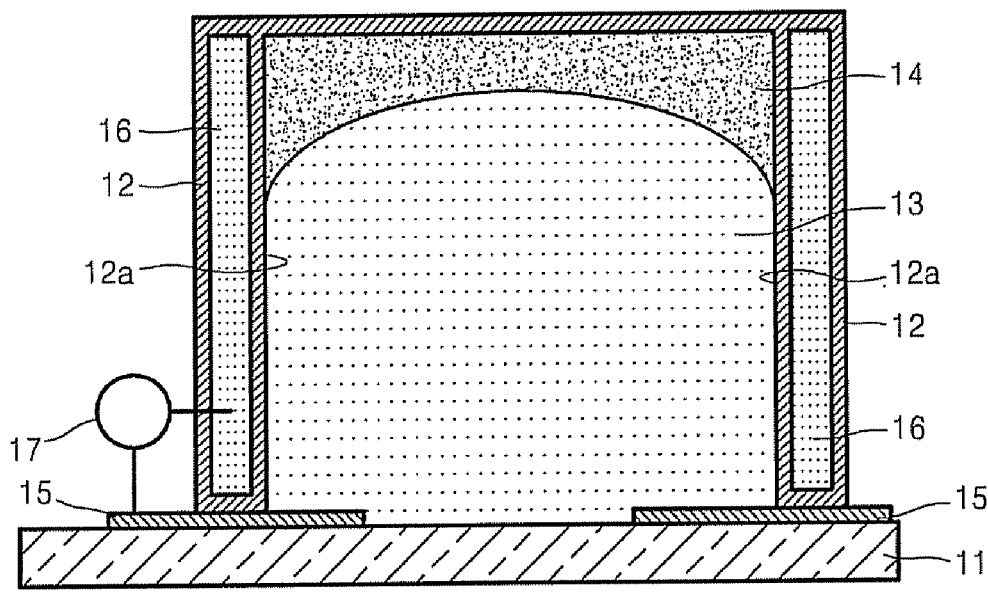
FIGS. 1A and 1B are schematic cross-sectional views illustrating a conventional electrowetting lens.

The invention now will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, an electrowetting lens which can change an optical axis thereof using a multiple electrode structure according to an exemplary embodiment of the present invention will be described in further detail with reference to the accompanying drawings.

Figure 3:
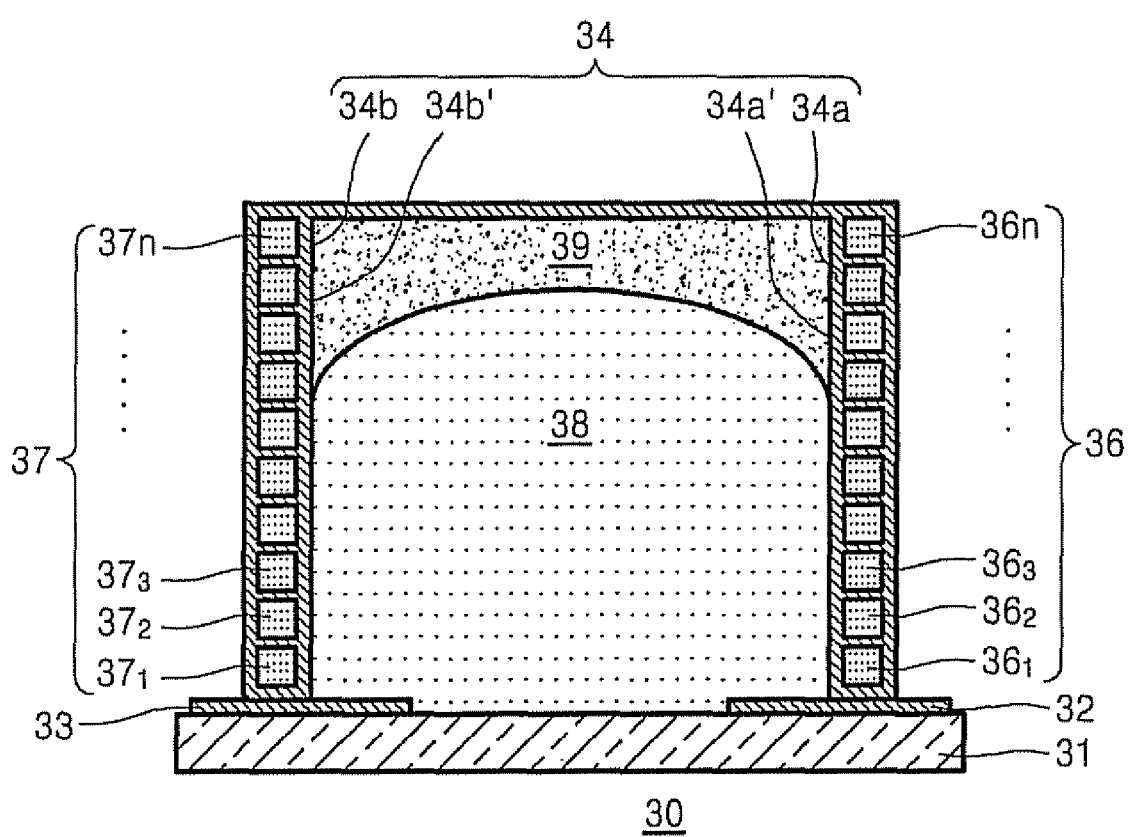
FIG. 3 is a vertical cross-sectional view schematically illustrating an electrowetting lens according to an exemplary embodiment of the present invention.

FIG. 3 is a vertical cross-sectional view schematically illustrating an electrowetting lens 30 according to an exemplary embodiment of the present invention. Referring to FIG. 3, the electrowetting lens 30 includes a substrate 31, a dielectric barrier wall 34 formed on the substrate 31, a polar solution 38 and a non-polar solution 39 filled inside the dielectric barrier wall 34, first and second lower electrodes 32 and 33 contacting the polar solution 38 through a lower portion of the dielectric barrier wall 34, and first and second multiple electrodes 36 and 37 respectively disposed in mutually facing legs 34a and 34b of the dielectric barrier wall 34.

The substrate 31 is formed of a transparent material (e.g., a light-transmitting material) such as glass. The dielectric barrier wall 34 can be formed of $BaTiO_3$. The polar solution 38 can be an aqueous solution having water as a solvent. The non-polar solution 39 may be an oil solution having oil as a solvent. Here, the refractive index of the polar solution 38 is different from a refractive index of the non-polar solution 39. The refractive indexes of the polar and non-polar solutions 38 and 39 can be adjusted to desired values by varying solutes of the polar and non-polar solutions 38 and 39. This feature of adjusting the refractive indexes of the polar and non-polar solutions will not be described in further detail since it is well known to those of ordinary skill in the related art.

Figure 1B:
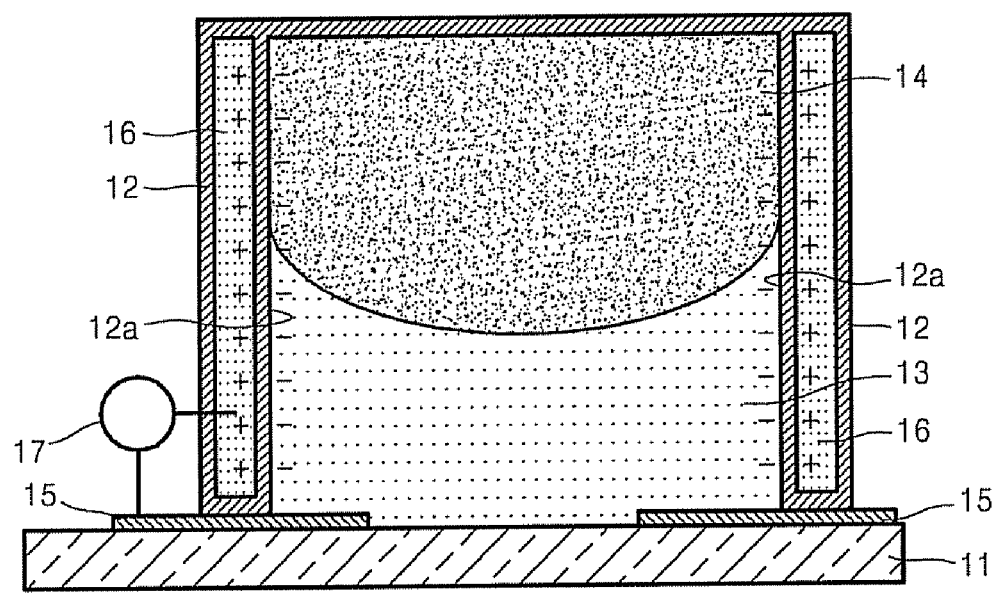
Figure 2A:
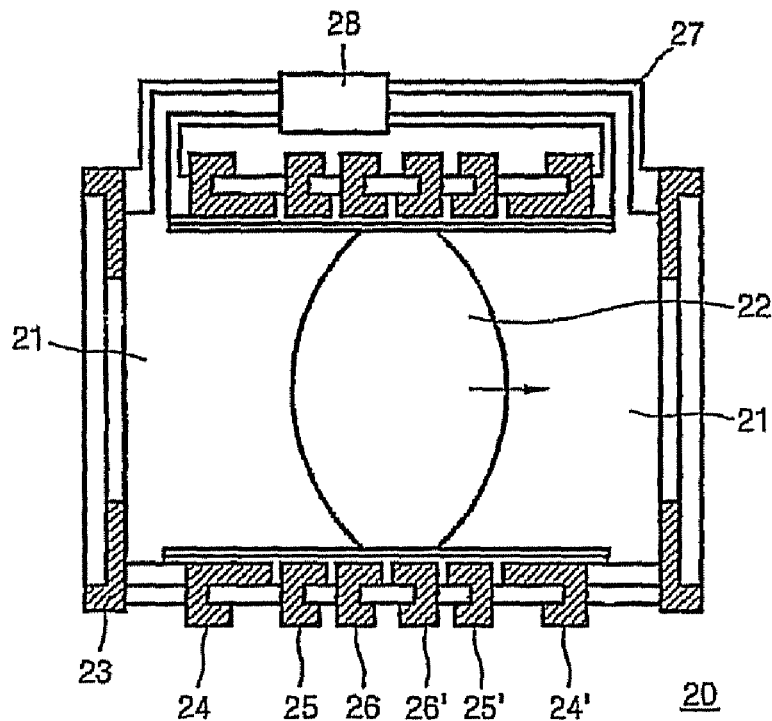
FIGS. 2A and 2B are schematic cross-sectional views illustrating another conventional electrowetting lens.
Figure 2B:
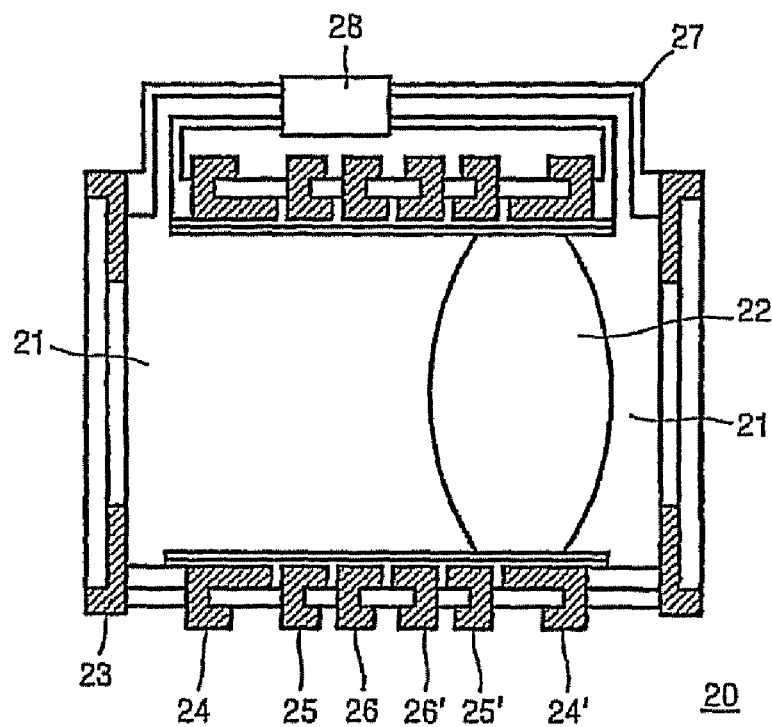

Although not shown in FIG. 3, hydrophobic layers are formed on inner surfaces 34a' and 34b' of the legs 34a and 34b of the dielectric barrier wall 34 like in the conventional electrowetting lens of FIGS. 1A and 1B. The hydrophobic layers may be formed of a fluoropolymer. Since the inner surfaces 34a' and 34b' of the dielectric barrier wall 34 are coated with the hydrophobic layers, the polar solution 38 tends to reduce contact area with the inner surfaces 34a' and 34b' of the dielectric barrier wall 34. On the other hand, the non-polar solution 39 tends to increase contact area with the inner surfaces 34a' and 34b' of the dielectric barrier wall 34. For this reason, the polar solution 38 has a convex top surface in an initial state as shown in FIG. 3.

In the current exemplary embodiment, the first and second lower electrodes 32 and 33 pass through lower portions of the mutually facing legs 34a and 34b of the dielectric barrier wall 34 and face each other. The first and second multiple electrodes 36 and 37 are respectively disposed in the mutually facing legs 34a and 34b and are opposite each other. The first lower electrode 32 and the first multiple electrode 36 may be located at the same leg 34a of the dielectric barrier wall 34, and the second lower electrode 33 and the second multiple electrode 37 may be located at the same leg 34b of the dielectric barrier wall 34. As shown in FIG. 3, the first multiple electrode 36 includes a plurality of electrode cells $36_1$, $36_2$, through $36_n$, and the second multiple electrodes 37 includes a plurality of electrode cells $37_1$, $37_2$, through $37_n$. In the current exemplary embodiment of the present invention, a voltage can be applied to each of the electrode cells $36_1$, through $36_n$ and $37_1$ through $36_n$ in an individual manner. For example, a voltage can be applied to only some of the electrode cells $36_1$ through $36_n$ and to only some of the electrode cells $37_1$ through $36_n$. Further, different voltages can be individually applied to the electrode cells $36_1$ through $36_n$ and $37_1$ through $36_n$.

FIGS. 4A through 4D are horizontal cross-sectional views illustrating exemplary structures of the electrowetting lens 30 according to exemplary embodiments of the present invention.

Figure 4A:
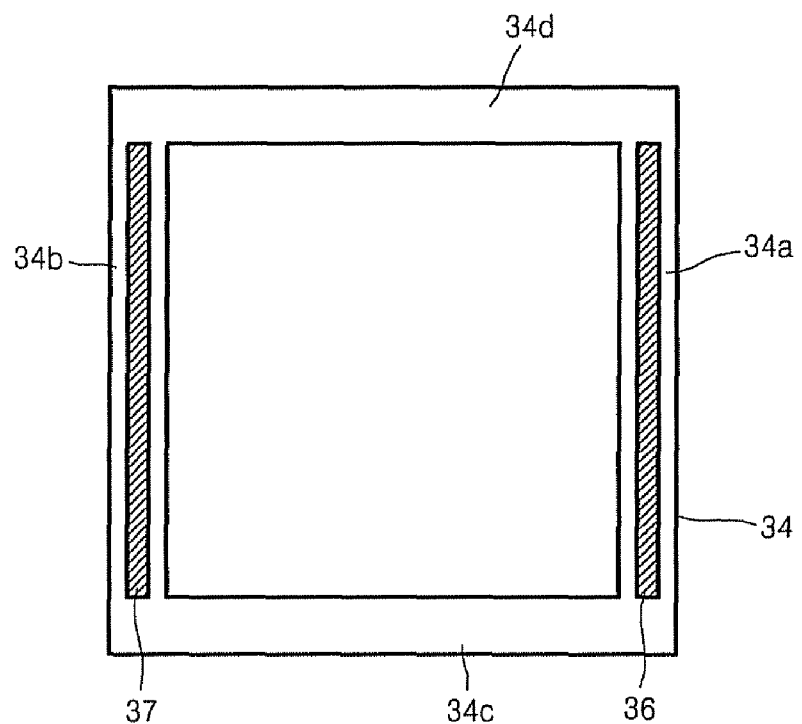
FIGS. 4A through 4D are horizontal cross-sectional views illustrating exemplary structures of an electrowetting lens according to exemplary embodiments of the present invention.
Figure 4B:
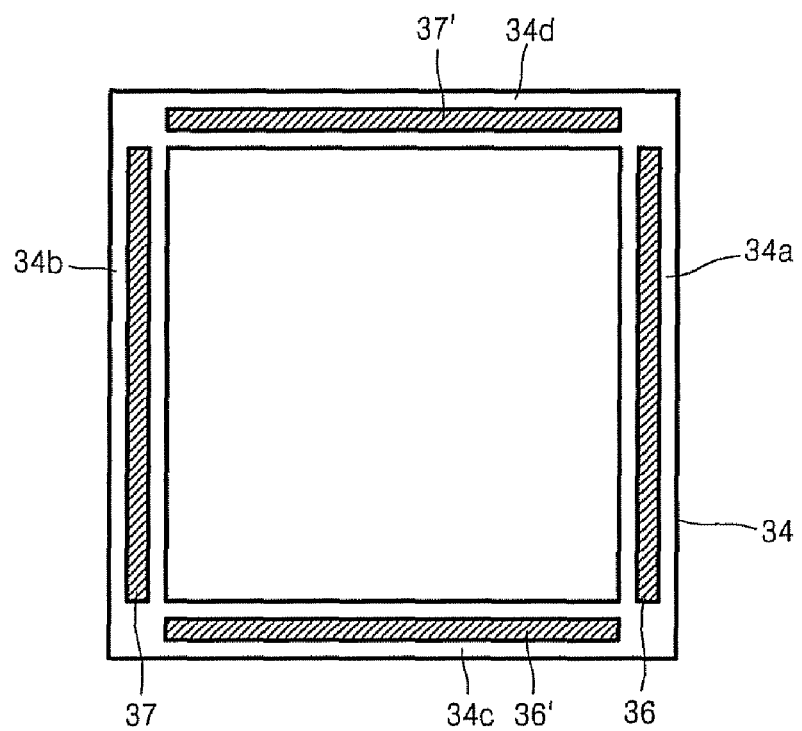

Referring to FIGS. 4A and 4B, the electrowetting lens 30 includes a dielectric barrier wall 34 having a rectangular shape when viewed from the top. Although the dielectric barrier wall 34 has a rectangular box shape in FIGS. 4A and 4B, the dielectric barrier wall 34 can have different shapes as well in alternative exemplary embodiments. For example, the dielectric barrier wall 34 can have a hexagonal box shape or the dielectric barrier wall 34 can have a polygonal or square box shape.

In the exemplary embodiment illustrated in FIG. 4A, first and second multiple electrodes 36 and 37 are respectively disposed in mutually facing legs 34a and 34b of the dielectric barrier wall 34. Although not shown in FIG. 4A, first and second lower electrodes 32 and 33 pass through lower portions of the mutually facing legs 34a and 34b of the dielectric barrier wall 34. In the exemplary embodiment illustrated in FIG. 4B, two first multiple electrodes 36 and 36' are respectively disposed in two legs 34a and 34c of the dielectric barrier wall 34. The two first multiple electrodes 36 and 36' face two second multiple electrodes 37 and 37' that are respectively disposed in the other two legs 34b and 34d of the dielectric barrier wall 34. When the dielectric barrier wall 34 has a polygonal box shape, at least one pair of first lower and multiple electrodes 32 and 36 and at least one pair of second lower and multiple electrodes 33 and 37 can be disposed at mutually facing legs of the dielectric barrier wall 34.

Figure 4C:
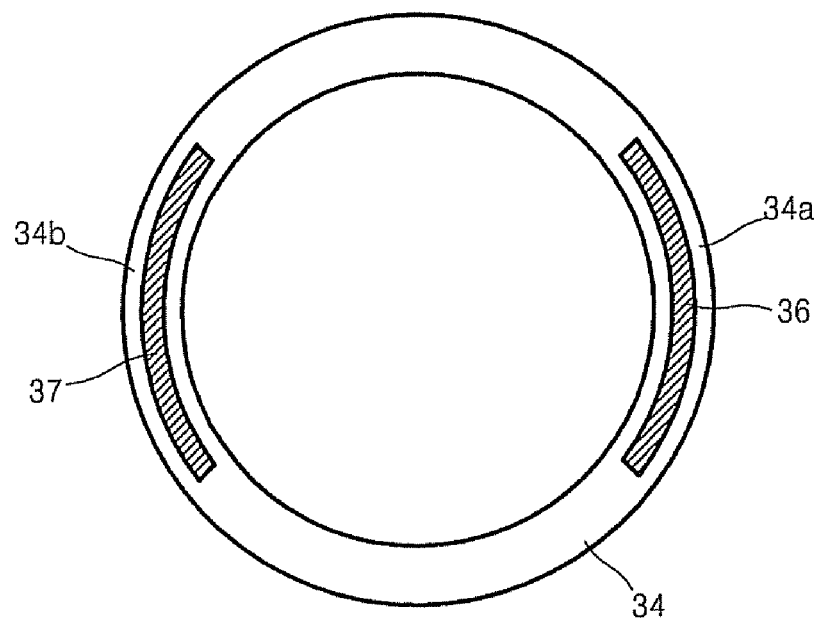
Figure 4D:
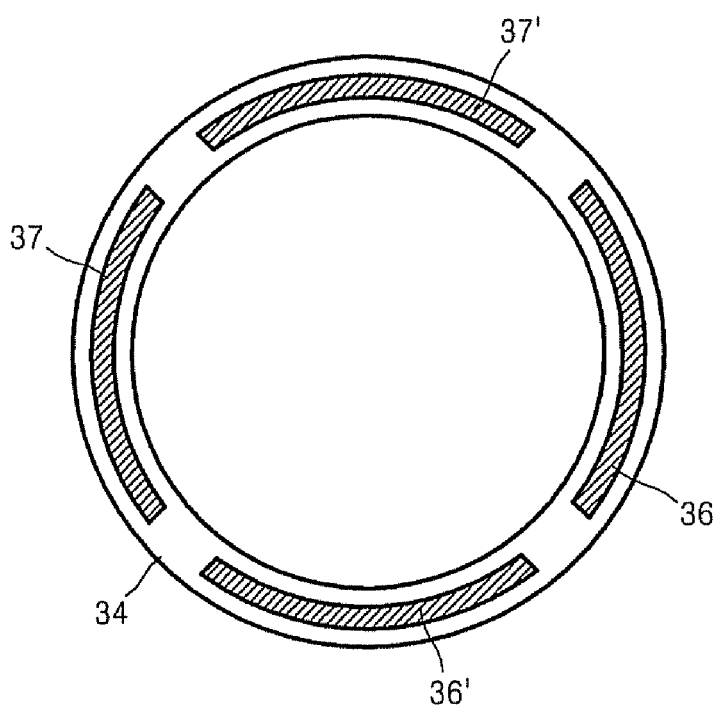

FIGS. 4C and 4D illustrate circular dielectric barrier walls 34 according to alternative exemplary embodiments of the present invention. Referring to FIG. 4C, a first multiple electrode 36 and a second multiple electrode 37 can be disposed along the circumference of the circular dielectric barrier wall 34 at mutually facing arcs 34a and 34b. Although not shown in FIG. 4C, first and second lower electrodes 32 and 33 can be disposed at the mutually facing arcs 34a and 34b, respectively, corresponding with the first and second multiple electrodes 36 and 37. Alternatively, a plurality of first lower electrodes 32 and first multiple electrodes 36 and a plurality of second lower electrodes 33 and second multiple electrodes 37 can be disposed along the circumference of the circular dielectric barrier wall 34 in a mutually facing manner. Referring to FIG. 4D, two first multiple electrodes 36 and 36' and two second multiple electrodes 37 and 37' are disposed along the circumference of a circular dielectric barrier wall 34 according to an alternative exemplary embodiment of the present invention. In the embodiment of FIG. 4D, the four multiple electrodes 36, 36', 37, and 37' are respectively disposed at four 90-degree arcs of the circular dielectric barrier wall 34. However, five or more multiple electrodes can be respectively disposed at smaller arcs of the circular dielectric barrier wall 34 in further alternative exemplary embodiments, as will be recognized by those of ordinary skill in the related art.

Figure 5A:
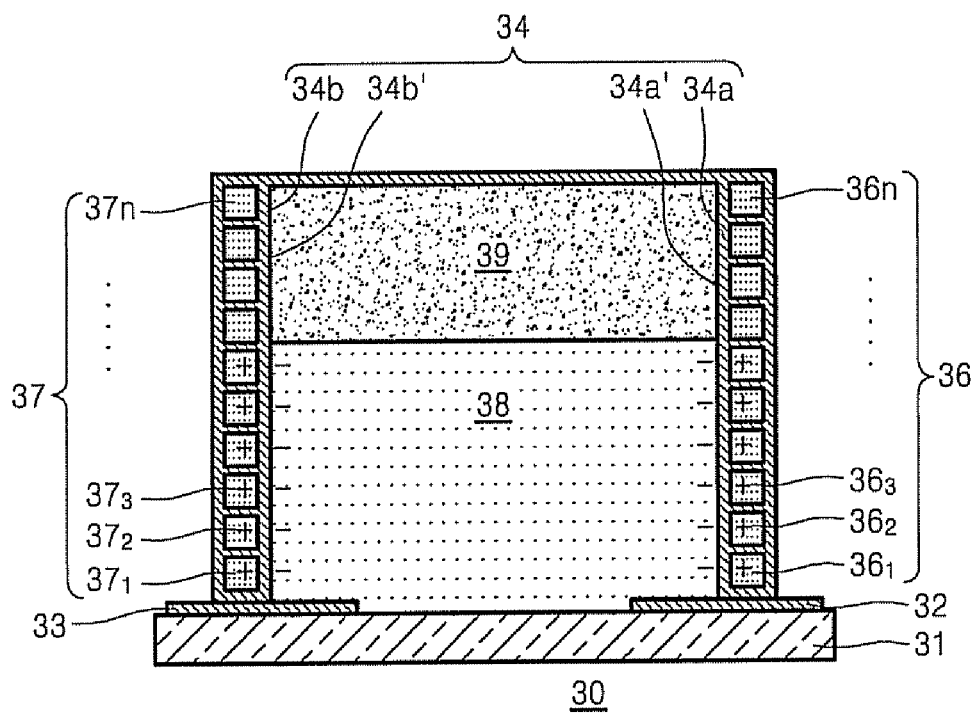
FIGS. 5A and 5B are vertical cross-sectional views of the exemplary electrowetting lens of FIG. 3 for explaining an operation thereof according to an exemplary embodiment of the present invention.
Figure 5B:
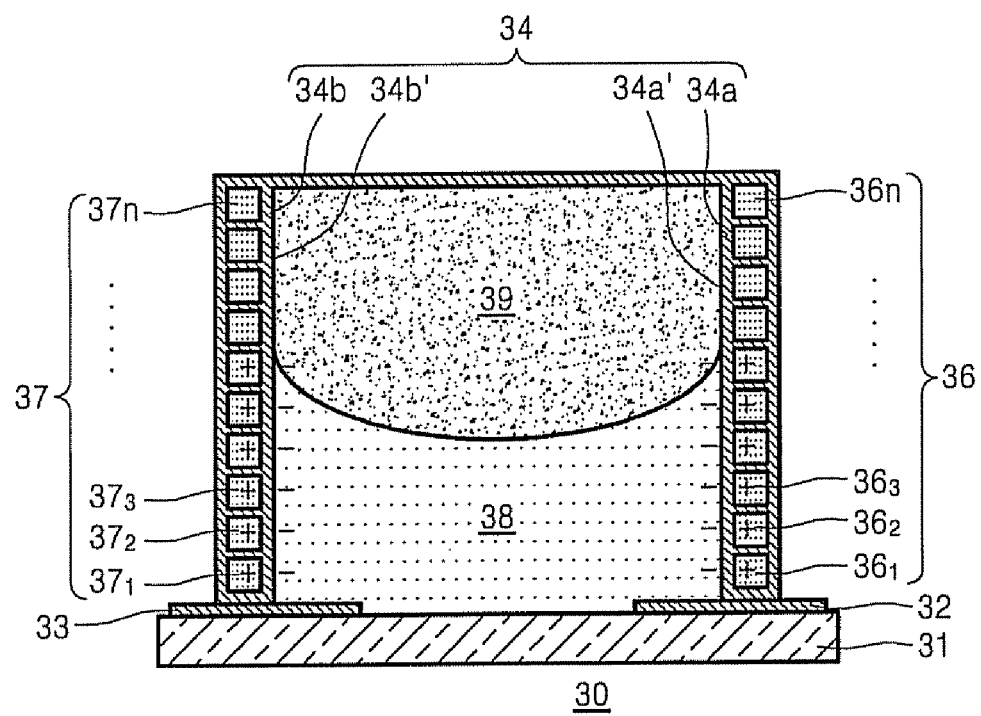

FIGS. 5A and 5B are vertical cross-sectional views of the exemplary electrowetting lens 30 of FIG. 3 for explaining an operation thereof to an exemplary embodiment of the present invention.

When the electrowetting lens 30 is in an initial state as shown in FIG. 3, a voltage is applied to the first lower electrode 32, the first multiple electrode 36, the second lower electrode 33 and the second multiple electrode 37. Then, as described above, the inner surfaces 34a' and 34b' of the dielectric barrier wall 34 are electrically charged, and thus the hydrophobic layers formed on the inner surfaces 34a' and 34b' of the dielectric barrier wall 34 are changed from hydrophobic to hydrophilic. Here, the hydrophobic layers can be changed to a desired hydrophilic level by adjusting the voltage applied to the lower electrodes 32 and 33 and the multiple electrodes 36 and 37. Meanwhile, the polarity of the applied voltage does not affect the change of the hydrophobic layers. As the applied voltage increases from a lower level to a critical level, the convex top surface of the polar solution 38 (as in FIG. 3) is gradually flattened. When the applied voltage reaches the critical level, the interface between the polar solution 38 and the non-polar solution is completely flattened as shown in FIG. 5A. When the applied voltage increases above the critical level, the interface between the polar and non-polar solutions 38 and 39 is curved toward the polar solution 38, and as a result, the top surface of the polar solution 38 is concaved. Here, the critical level of the applied voltage may vary depending on the kinds of polar solution 38 and non-polar solution 39, the material of the dielectric barrier wall 34 and the material of the hydrophobic layers.

According to the present invention, the first and second multiple electrodes 36 and 37 include a plurality of electrode cells $36_1$ through $36_n$ and $37_1$ through $37_n$. Therefore, it is not necessary to apply a voltage to all of the electrode cells $36_1$, through $36_n$ and $37_1$ through $37_n$ to obtain the effect described above. That is, as shown in FIGS. 5A and 5B, a voltage can be applied to only some of the electrode cells $36_1$ through $36_n$ and to only some of the electrode cells $37_1$ through $37_n$ which face the polar solution 38. Furthermore, a voltage can be applied to only a much smaller number of electrode cells. That is, a voltage can be applied to only the electrode cells located near the interface between the polar and non-polar solutions 38 and 39. In this manner, the effect shown in FIGS. 5A and 5B can be obtained with less power consumption. Moreover, if necessary, a voltage applied to the electrode cells facing the polar solution 38 can be different from a voltage applied to the other electrode cells not facing the polar solution 38. Similarly, a voltage applied to the electrode cells located near the interface between the polar and non-polar solutions 38 and 39 can be different from a voltage applied to the other electrode cells located away from the interface.

Figure 6A:
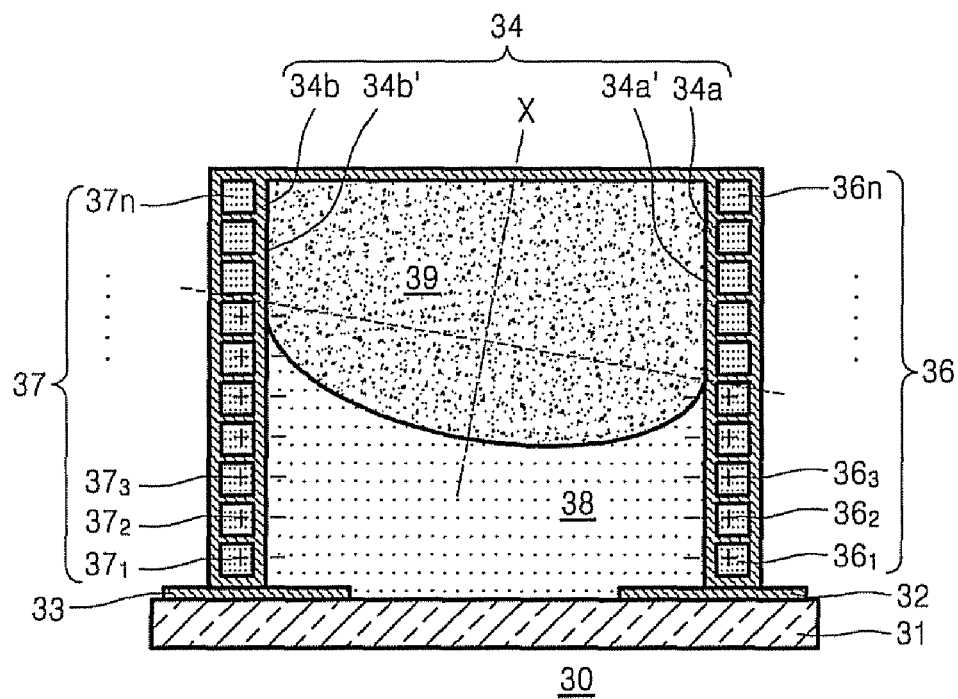
FIGS. 6A through 7B are vertical cross-sectional views of an exemplary electrowetting lens for explaining an operation thereof according to another exemplary embodiment of the present invention.
Figure 6B:
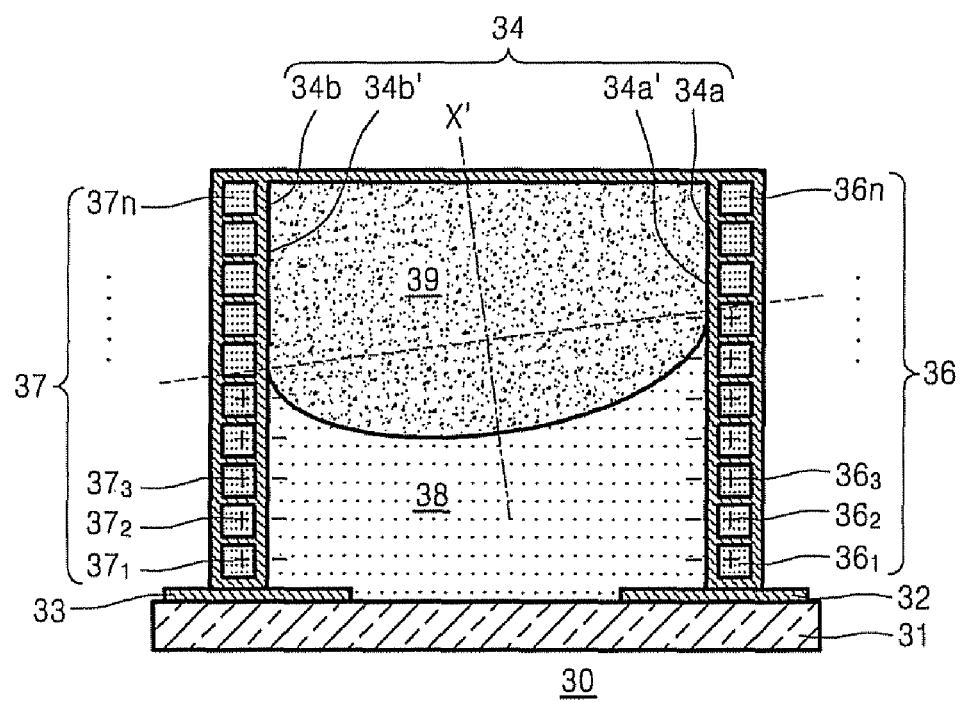

In another exemplary embodiment of the present invention, it is possible to make the interface between the polar and non-polar solutions 38 and 39 be inclined by applying a voltage to differently located electrode cells of the first and second multiple electrodes 36 and 37. For example, from the state where a voltage is applied to some of the electrode cells of the first and second multiple electrodes 36 and 37 so as to make the top surface of the polar solution 38 concave as shown in FIG. 5B, the voltage supply is adjusted so as to decrease the height of the charged electrode cells of the first multiple electrode 36 and increase the height of the charged electrode cells of the second multiple electrode 37. Then, as shown in FIG. 6A, the interface between the polar and non-polar solutions 38 and 39 slopes down from the left to the right, and thus an optical axis X of the electrowetting lens 30 inclines to the right. On the other hand, when the voltage supply is adjusted from the state shown in FIG. 5B so as to increase the height of the charged electrode cells of the first multiple electrode 36 and decrease the height of the charged electrode cells of the second multiple electrode 37, an optical axis X' of the electrowetting lens 30 inclines to the left as shown in FIG. 6B. In this manner, the focusing direction (angle) of the electrowetting lens 30 can be changed. Meanwhile, when four multiple electrodes are included in the electrowetting lens 30 as shown in FIG. 4B or 4D, the optical axis of the electrowetting lens 30 can be adjusted in front, back, left and right directions by making the heights of charged electrode cells of mutually facing multiple electrodes different from each other.

Figure 7A:
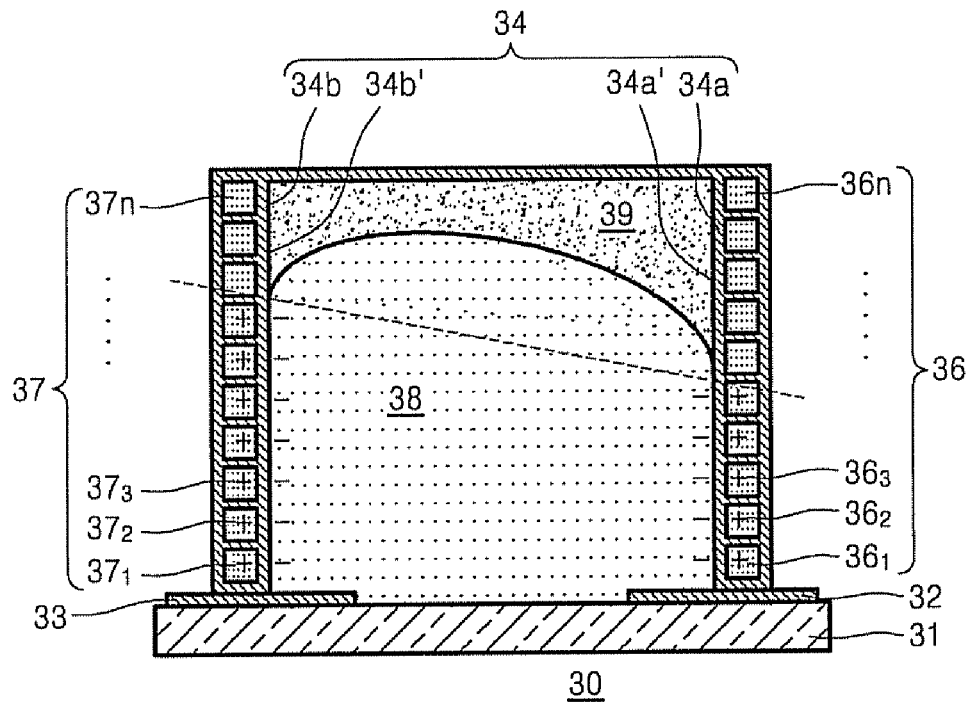
Figure 7B:
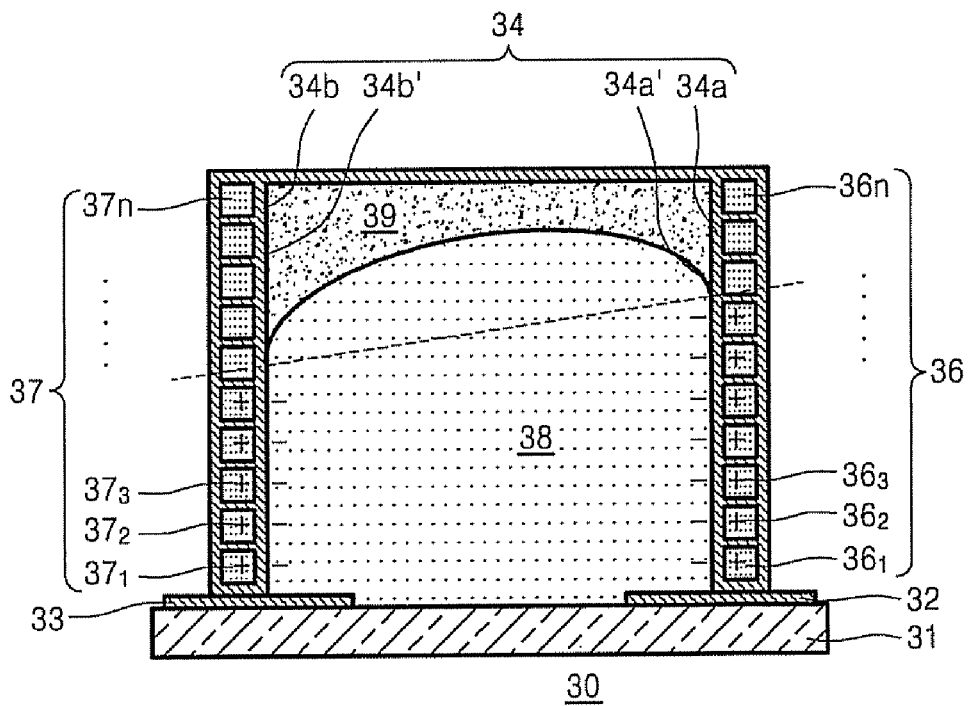

When a voltage lower than the critical level is applied to the first and second multiple electrodes 36 and 37 in such a manner that the height of charged electrode cells of the first multiple electrode 36 is different from the height of charged electrode cells of the second multiple electrode 37, the interface between the polar and non-polar solutions 38 and 39 is shaped as shown in FIG. 7A or 7B. That is, when a voltage lower than the critical level is applied to the first and second multiple electrodes 36 and 37 in such a manner that the height of charged electrode cells of the first multiple electrode 36 is lower than the height of charged electrode cells of the second multiple electrode 37, the top surface of the polar solution 38 is convex and sloped down from the left to the right as shown in FIG. 7A. Further, when a voltage lower than the critical level is applied to the first and second multiple electrodes 36 and 37 in such a manner that the height of charged electrode cells of the first multiple electrode 36 is larger than the height of charged electrode cells of the second multiple electrode 37, the top surface of the polar solution 38 is convex and sloped down from the right to the left as shown in FIG. 7B.

The electrowetting lens 30 of the present invention can be applied to various fields, and particularly, to three-dimensional image display devices capable of displaying both two- and three-dimensional images. A commonly used three-dimensional image display device includes a microlens array or a lenticular lens sheet so as to separate left- and right-eye images (e.g., an image for a left eye and another image for a right eye) displayed on a display panel and direct the left-eye image toward the left eye of a viewer and the right-eye image toward the right eye of the viewer. According to the present invention, a microlens array can be fabricated by two-dimensionally arranging a plurality of electrowetting lenses 30 as in the above described structure on a single transparent substrate. Further, a lenticular lens sheet can be fabricated by arranging a plurality of electrowetting lenses 30 having an elongated rectangular shape and attaching them side by side.

Figure 8:
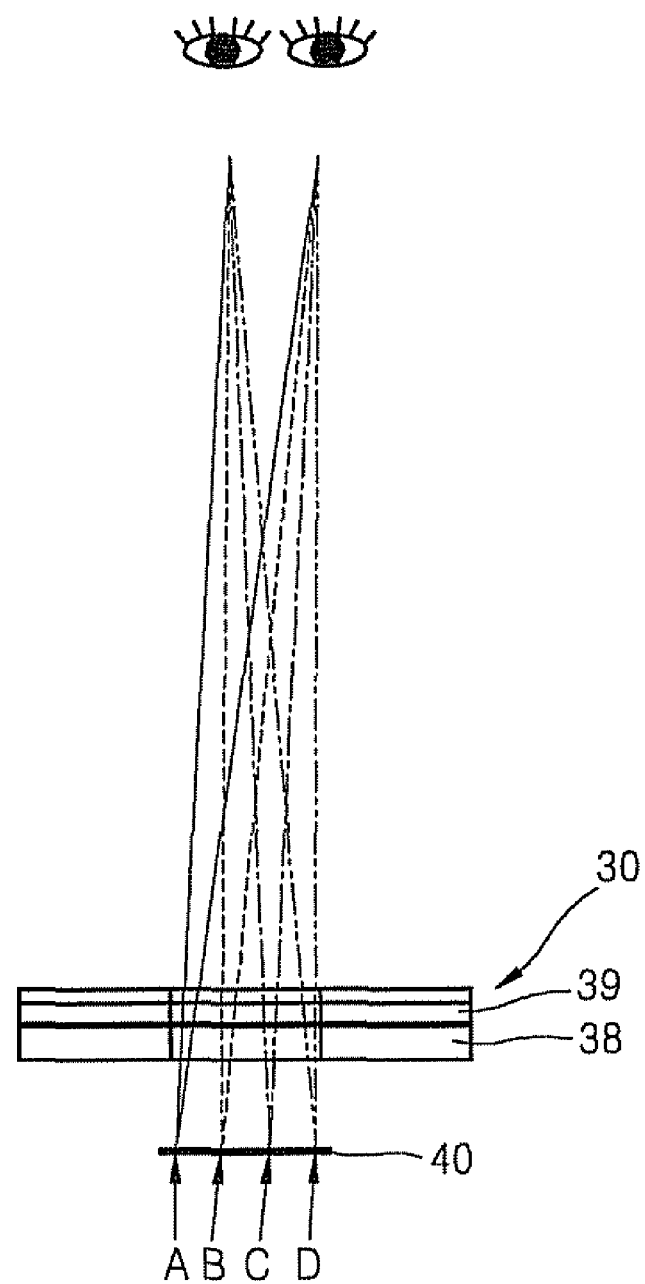
FIGS. 8 through 11 illustrate a three-dimensional image display device with electrowetting lenses according to exemplary embodiments of the present invention.

FIG. 8 illustrates a three-dimensional image display device displaying a two-dimensional image using electrowetting lenses 30 according to an exemplary embodiment of the present invention. Referring to FIG. 8, the electrowetting lenses 30 are arranged above a display panel 40. When a two-dimensional image is displayed on the display panel 40, a voltage having a critical level is applied to electrode cells of first and second multiple electrodes 36 and 37 (see FIGS. 3-7B) of the electrowetting lenses 30. Then, the interface between polar and non-polar solutions 38 and 39 inside the electrowetting lenses 30 is flattened (e.g., neither convex nor concave). As a result, light is transmitted through the electrowetting lenses 30 without refraction. Therefore, the two-dimensional image displayed on all pixels of the display panel 40 can be incident onto both eyes of a viewer.

Figure 9:
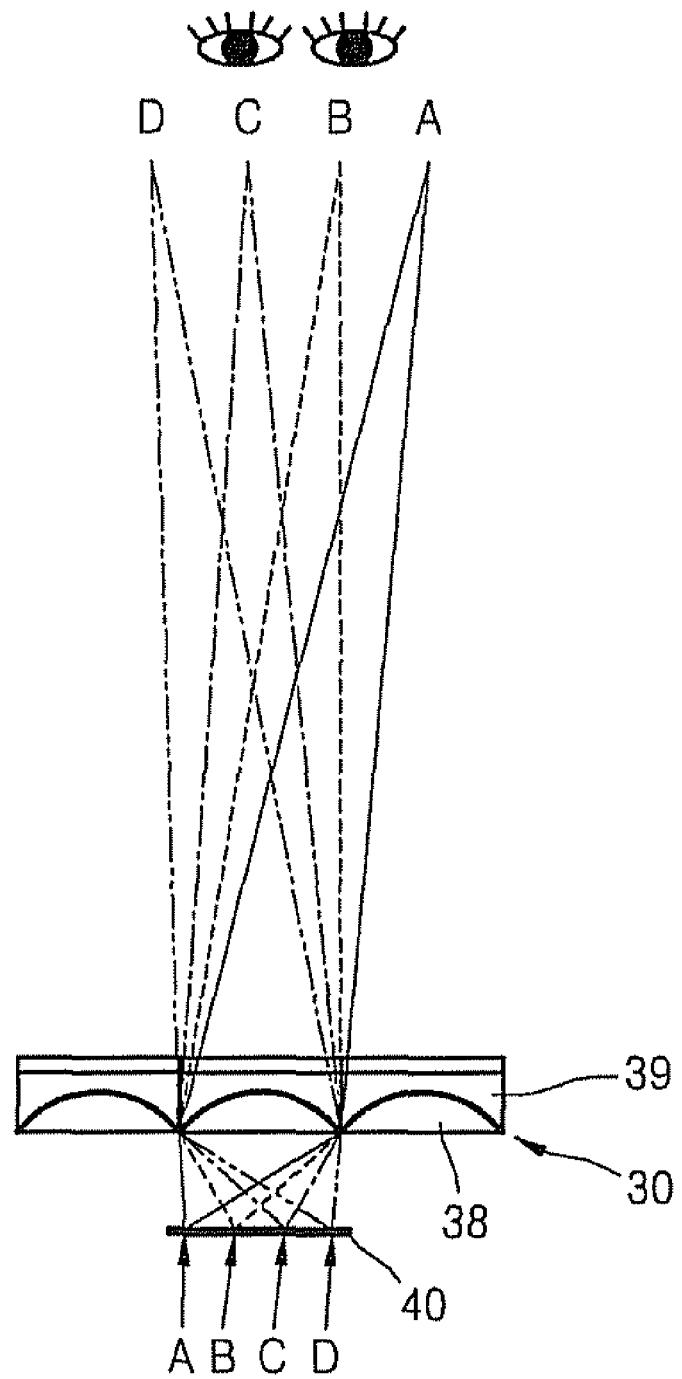

Meanwhile, when the refractive index of the polar solution 38 is larger than that of the non-polar solution 39, and a voltage lower than the critical level or no voltage is applied to the electrode cells of the first and second multiple electrodes 36 and 37, the electrowetting lenses 30 function as convex lenses. On the contrary, when the refractive index of the non-polar solution 39 is larger than that of the polar solution 38, the electrowetting lenses 30 can function as convex lenses by applying a voltage higher than the critical level to the electrode cells of the electrowetting electrodes 36 and 37. In this state, when the display panel 40 displays left-eye and right-eye images alternately per each pixel of the display panel 40, the electrowetting lenses 30 function as convex lenses to separate the left-eye and right-eye images and direct the separated left-eye and right-eye images respectively to left and right eyes of a viewer as shown in FIG. 9. Therefore, the viewer can view a three-dimensional image.

Figure 10:
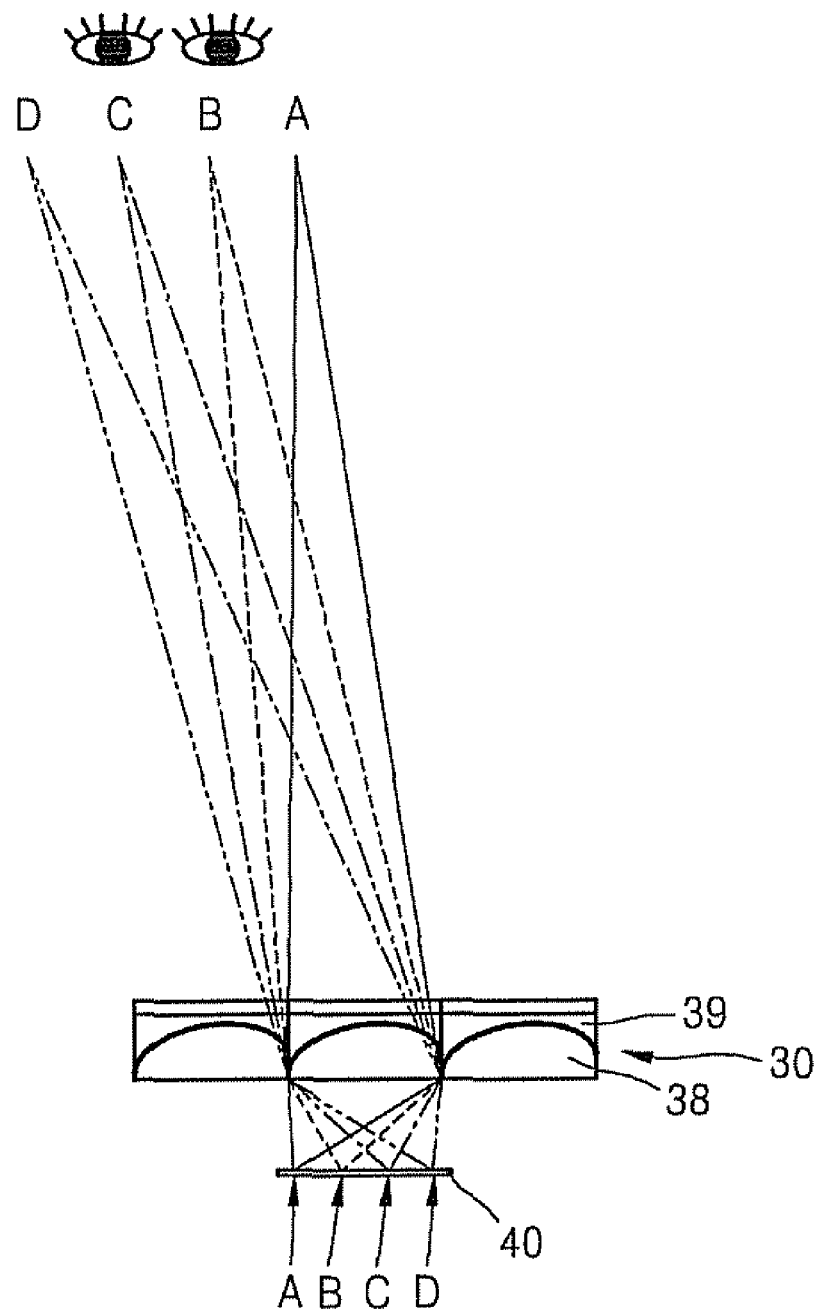

Generally, when a viewer is at a predetermined location away from a three-dimensional image display device, the viewer can enjoy an exact three-dimensional image. Thus, when the viewer moves away from the predetermined location, the viewer cannot view an exact three-dimensional image. As described above, according to the present invention, the optical axis of the electrowetting lens 30 can be changed by making the height of charged electrode cells of the first multiple electrode 36 different from the height of charged electrode cells of the second multiple electrode 37. Referring to FIG. 10, although the viewer moves to one side of the three-dimensional image display device, the three-dimensional image display device can provide an exact three-dimensional image by inclining the optical axes of the electrowetting lenses 30 toward the viewer.

Figure 11:
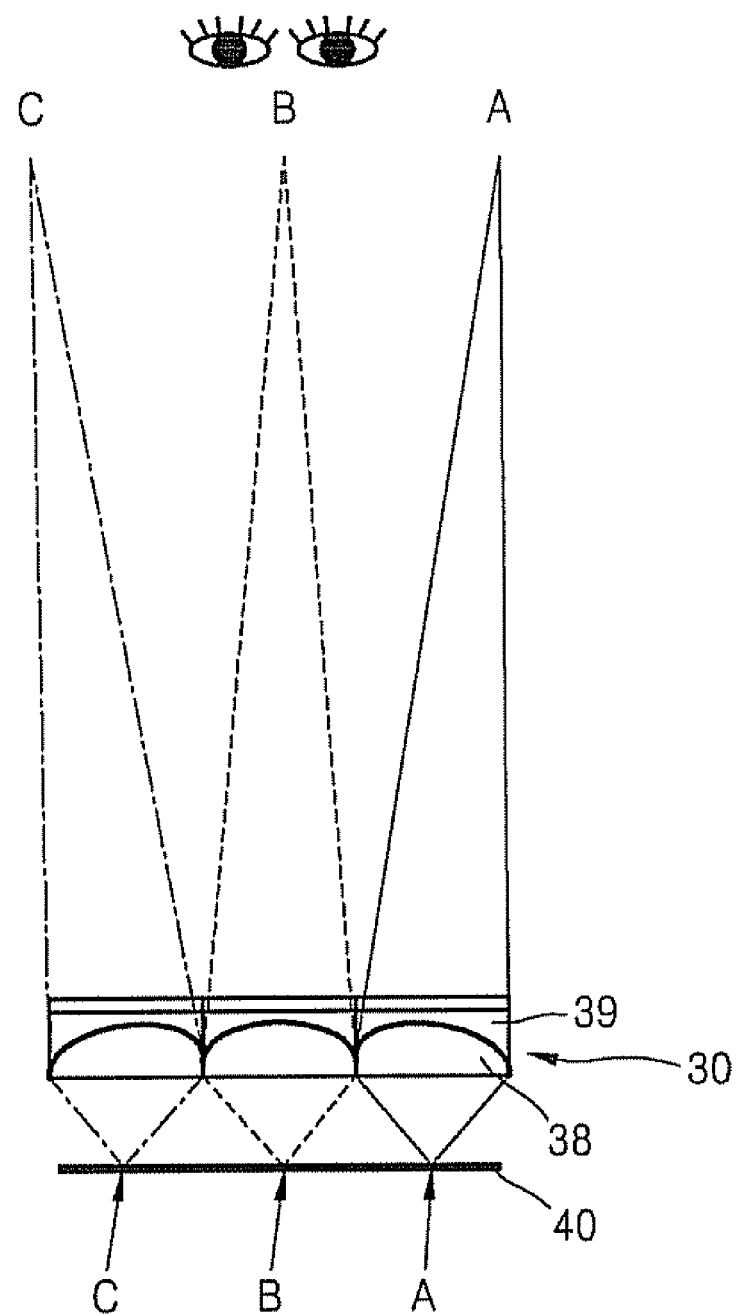

Furthermore, although the optical axes of all of the electrowetting lenses 30 are inclined in the same direction in FIG. 10 (e.g., all inclined to the right), the optical axes of the electrowetting lenses 30 can be inclined in different directions as shown in FIG. 11 (e.g., one inclined to the right, an opposite one inclined to the left and an intermediate one having no incline). In this case, different images can be provided depending on the location of the viewer relative to the three-dimensional image display device.

Figure 12A:
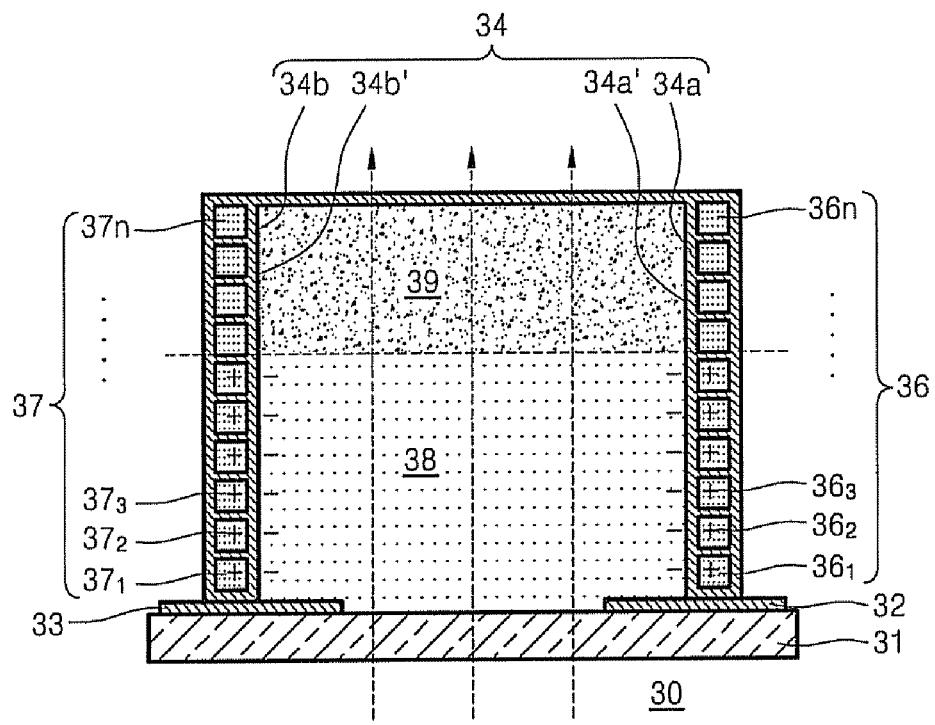
FIGS. 12A through 12C are vertical cross-sectional views of exemplary electrowetting lens illustrating optic path controlling operations according to exemplary embodiments of the present invention.
Figure 12B:
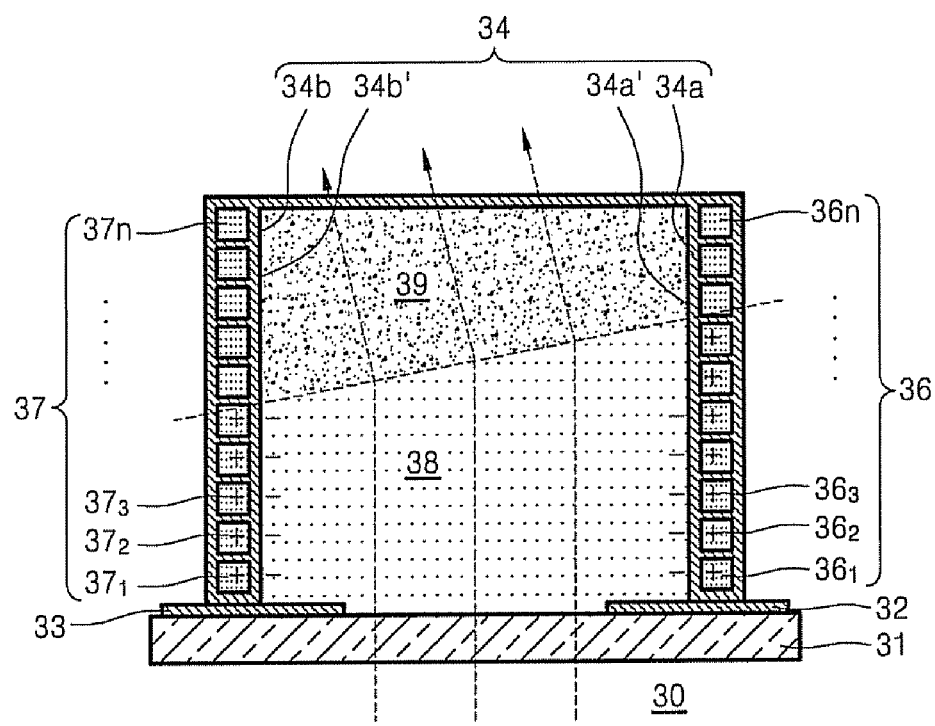
Figure 12C:
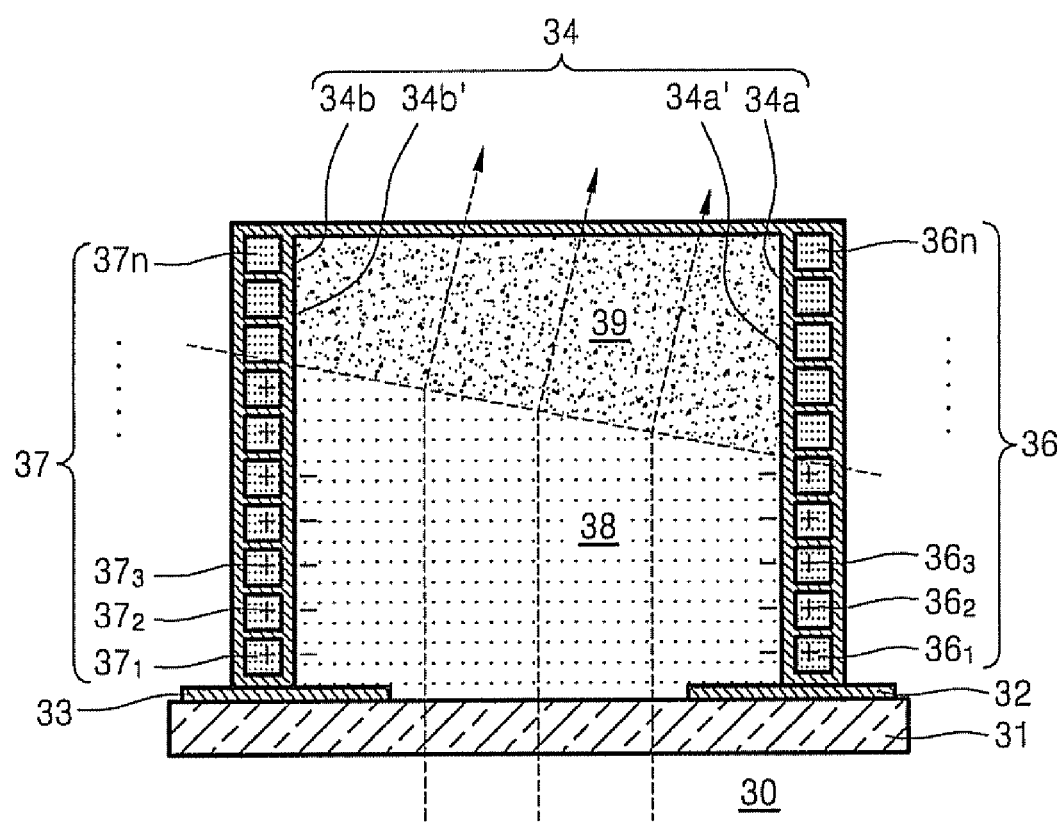

Meanwhile, as shown in FIG. 5A, after the interface between the polar and non-polar solutions 38 and 39 is flattened by applying a voltage having the critical level to the first and second multiple electrodes 36 and 37, the interface can be inclined. For example, FIG. 12A shows the case where the height of charged electrode cells of the first multiple electrode 36 is the same as the height of the charged electrode cells of the second multiple electrode 37. In this case, the electrowetting lens 30 transmits light without refraction. Referring to FIG. 12B, the height of charged electrode cells of the first multiple electrode 36 is adjusted to a higher level as compared with the height of the charged electrode cells of the second multiple electrode 37, so that the flat interface between the polar and non-polar solutions 38 and 39 can be sloped down from the right to the left. In this case, light is refracted to the left while passing through the electrowetting lens 30. On the contrary, referring to FIG. 12C, the height of charged electrode cells of the first multiple electrode 36 is adjusted to a lower level as compared with the height of the charged electrode cells of the second multiple electrode 37. Thus, the flat contact surface between the polar and non-polar solutions 38 and 39 is sloped down from the left to the right. In this case, light is refracted to the right while passing through the electrowetting lens 30. Therefore, the electrowetting lens 30 of the present invention can be used for dynamic optical path control devices.

As described above, according to the present invention, the optical axis of the electrowetting lens can be easily moved to a desired direction by adjusting the height of charged electrode cells of one multiple electrode different from the height of charged electrode cells of the other multiple electrode. The electrowetting lens of the present invention can be used for dynamic optical path control devices. Particularly, when the electrowetting lens of the present invention is used in a three-dimensional image display device, an exact three-dimensional image can be provided to a viewer regardless of the location of the viewer since the optical axis or the electrowetting lens can be controlled depending on the location of the viewer.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electrowetting lens comprising:
    a substrate; a dielectric barrier wall formed on the substrate and including a first leg and a second leg that are facing each other; polar and non-polar solutions fluidly contained inside the dielectric barrier wall; first and second lower electrodes inserted through lower portions of the dielectric barrier wall and disposed in contact with the polar solution, the first and second lower electrodes facing each other; and
    first and second multiple electrodes respectively disposed within the walls of the mutually facing first and second legs defining the dielectric barrier wall, each of the first and second multiple electrodes being divided into a plurality of greater than two vertically arranged electrode cells disposed within a respective leg.

2. The electrowetting lens of claim 1, wherein the substrate is transparent.

3. The electrowetting lens of claim 1, wherein both the first lower electrode and the first multiple electrode are disposed at the first leg of the dielectric barrier wall, and both the second lower electrode and the second multiple electrode are disposed at the second leg of the dielectric barrier wall.

4. The electrowetting lens of claim 1, wherein when the dielectric barrier wall has a circular box shape, at least one pair of a first lower electrode and a first multiple electrode and at least one pair of a second lower electrode and a second multiple electrode are arranged along a circumference of the dielectric barrier wall, and the pairs face each other.

5. The electrowetting lens of claim 1, wherein when the dielectric barrier wall has a polygonal shape, at least one pair of a first lower electrode and a first multiple electrode and at least one pair of a second lower electrode and a second multiple electrode are respectively disposed at the mutually facing first and second legs of the dielectric barrier wall.

6. The electrowetting lens of claim 1, wherein the electrode cells of the first and second multiple electrodes each individually receive a voltage.

7. The electrowetting lens of claim 6, wherein an interface between the polar and non-polar solutions is sloped by making a height of charged electrode cells of the first multiple electrode different from a height of charged electrode cells of the second multiple electrode.

8. The electrowetting lens of claim 6, wherein a voltage is applied to only some of the electrode cells located at an interface between the polar and non-polar solutions.

9. The electrowetting lens of claim 6, wherein a voltage applied to some of the electrode cells located at an interface between the polar and non-polar solutions is different from a voltage applied to the other electrode cells.

10. The electrowetting lens of claim 6, wherein a voltage is applied to only some of the electrode cells facing the polar solution.

11. The electrowetting lens of claim 6, wherein a voltage applied to some of the electrode cells facing the polar solution is different from a voltage applied to the other electrode cells.

12. The electrowetting lens of claim 1, wherein the polar solution is an aqueous solution, and the non-polar solution is an oil solution.

13. The electrowetting lens of claim 12, wherein the aqueous solution and the oil solution have different refractive indexes.

14. The electrowetting lens of claim 1, wherein the dielectric barrier wall has a circular or polygonal box shape.

\* \* \* \* \*